No. 682,577. Patented Sept. 10, 1901.
C. A. TRIPP.
HOSE COUPLING.
(Application filed June 17, 1901.)

(No Model.)

WITNESSES
Chas. L. Hyde.
Mattie McGinnis.

INVENTOR
Clarence A. Tripp
BY HIS ATTORNEYS
Hazard & Harpham.

UNITED STATES PATENT OFFICE.

CLARENCE A. TRIPP, OF LOS ANGELES, CALIFORNIA.

HOSE-COUPLING.

SPECIFICATION forming part of Letters Patent No. 682,577, dated September 10, 1901.

Application filed June 17, 1901. Serial No. 64,935. (No model.)

*To all whom it may concern:*

Be it known that I, CLARENCE A. TRIPP, a citizen of the United States, residing at Los Angeles, in the county of Los Angeles, State of California, have invented new and useful Improvements in Hose-Couplings, of which the following is a specification.

My invention relates to improvements in couplings for hose by means of which the air-pipes of one car are united to those of another car; and the objects thereof are to provide a dust-protector for closing the opening therein when the hose on one car is not coupled up with that of another car; to prevent dust and other substances from entering the hose and afterward passing into the triple valve and other parts of the air-brake mechanism when the hose is coupled, as is often the case with the open ports of the hose-couplers now in use for that purpose, and thereby causing the parts to wear out quickly and preventing their working properly, and also to provide for the slow escape of air from the pipes in case the couplers become accidentally uncoupled, thereby permitting the brakes to be set gently and without the sudden stop and jar that is now occasioned when the couplings accidentally come uncoupled in the quick setting of the brakes.

I accomplish these objects by the device described herein and illustrated in the accompanying drawings, forming a part hereof, in which—

Figure 1:
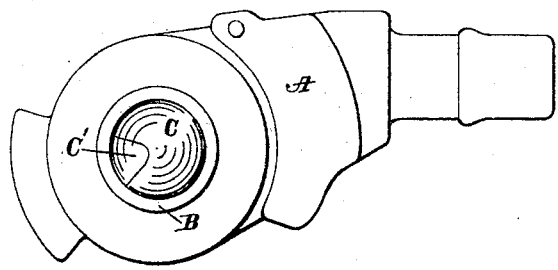
Figure 2:
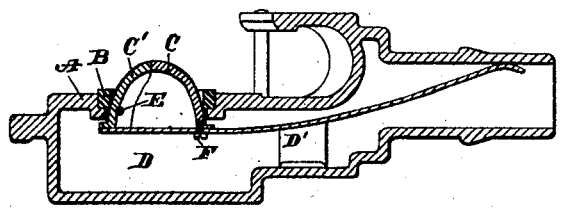
Figure 3:
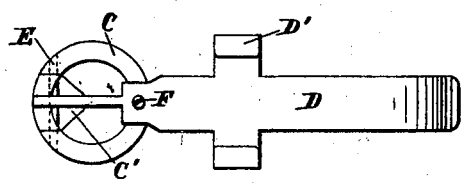

Figure 1 is a plan of one of the ordinary coupling-heads detached from the hose with my dust-protector in place therein. Fig. 2 is a central vertical longitudinal section of the same. Fig. 3 is a back plan view of the dust-protector removed from the coupling-head.

In the drawings, A is the ordinary coupling-head, which is attached to the hose on the air-pipes of railway-cars with which the air-pipes are coupled together when a train is made up.

B is the rubber gasket, by means of which an air-tight joint is made when the heads are coupled together.

C is a hollow hemispherical dust-stopper head, which is held spring-pressed by spring D in the opening in the gasket to prevent the dust or any other substance from entering the head when the hose is uncoupled. The dust-stopper is put in place as follows: The gasket is removed from the head and the dust-stopper is inserted therein through the opening when the gasket is replaced. The rear end of the spring contacts with the top of the shank of the coupling-head, and the legs D' of the spring rest on the bottom of the coupling-head. The resiliency of the spring causes the stopper-head to press firmly against the gasket, and thereby keep dust or any other substance from getting into the hose when the hose is uncoupled. To prevent the air from being trapped in the pipes when the hose is uncoupled, the stopper-head is cut into two parts, one of which, C', which for distinction we will call the "air-door," is hinged to the other part by pin E to turn outwardly from the main part and is held normally closed by the reduced end of spring D, which spring is fastened to the stopper-head, at the bottom thereof, at F opposite the base of the door. When the hose accidentally uncouples, as when a train pulls in two, this air-door permits the air-pressure to be slowly lowered in the train-pipe and the brakes to be set gently, thereby stopping the car gradually and gently and avoiding the sudden stop and jar which now occurs when the hose becomes accidentally uncoupled. As the top of the stopper is round and projects beyond the face of the gasket when the heads are coupled together, each dust-stopper will be pressed away from contact with its gasket, so as not to interfere with the free passage of air through the pipes.

Having described my invention, what I claim as new, and desire to secure by Letters Patent, is—

1. A dust-protector for air-hose coupling-heads, comprising a hemispherical stopper adapted to be spring-pressed to close the opening in the gasket of the coupling-head, and a spring affixed to the stopper-head adapted to press the stopper-head into tight contact with the gasket in the coupler-head, when the hose is uncoupled, and close the opening therein.

2. A dust-protector for the coupling-heads of air-hose, comprising a hollow hemispherical stopper-head, cut into two parts pivoted together, a portion of one of said parts being adapted to swing away from the other part; and a spring affixed to the stopper-head, adapted to pass into the coupler-head and press the stopper-head into tight contact with the gasket in the coupling-head, and to normally keep the parts of the stopper-head in contact at all points with each other.

3. A dust-protector for the coupling-heads of air-hose, comprising the stopper-head C attached to spring D, said spring having legs adapted to rest upon the bottom of the coupler-head and hold the stopper-spring pressed against the gasket.

In witness that I claim the foregoing I have hereunto subscribed my name this 8th day of June, 1901.

CLARENCE A. TRIPP.

Witnesses:
HENRY T. HAZARD,
G. E. HARPHAM.